United States Patent [19]

Rein

[11] 4,188,650
[45] Feb. 12, 1980

[54] DISKETTE WITH ACCESS COVER MEANS

[75] Inventor: Wolf-Heider Rein, Pforzheim, Fed. Rep. of Germany

[73] Assignee: International Standard Electric Corporation, New York, N.Y.

[21] Appl. No.: 883,597

[22] Filed: Mar. 6, 1978

[30] Foreign Application Priority Data

Mar. 8, 1977 [DE] Fed. Rep. of Germany ....... 2709944

[51] Int. Cl.$^2$ ............................................. G11B 23/02
[52] U.S. Cl. ................................................ 360/133
[58] Field of Search .................. 360/133, 97; 206/444

[56] References Cited

U.S. PATENT DOCUMENTS

| | | |
|---|---|---|
| 3,609,722 | 9/1971 | Zenzefillis ............................ 360/133 |
| 3,864,755 | 2/1975 | Hargis ................................... 360/133 |
| 4,120,012 | 10/1978 | Bowers ................................. 360/133 |

Primary Examiner—Robert S. Tupper

[57] ABSTRACT

A flexible memory disk for a computer or the like and adapted to be carried in a diskette. The disk has been known in the past and is known now as a "floppy disk". Auxiliary disks are inserted on each side of the memory disk. A housing is provided which contains all disks. Both housing and auxiliary disks contain corresponding slots and holes. The auxiliary disks are rotatable between two positions. In one position the slots are in alignment. Access is then provided for a read/write to engage a memory disk surface. In another position, the memory disk surface is covered by the auxiliary disks at the location of certain slots.

4 Claims, 6 Drawing Figures

DISKETTE WITH ACCESS COVER MEANS

BACKGROUND OF THE INVENTION

This invention relates to a rotatable memory disk insertable into a square housing, and more particularly to a diskette for computer storage or the like.

SUMMARY OF THE INVENTION

According to one aspect of the present invention, there is provided a diskette comprising: a housing having approximately parallel side walls, each of said side walls having a first opening therethrough, said first openings being aligned; a pair of parallel auxiliary disks slidable inside said housing against respective ones of said housing side walls; means to hold said auxiliary disks in fixed positions relative to each other, each of said auxiliary disks having a second opening, said second openings always being aligned with each other, said auxiliary disks being slidable back and forth on said respective side walls between first and second positions, said first openings being completely out of registration with said second openings when said auxiliary disks are in said first position, said first openings being at least in partial registration with said second openings when said auxiliary disks are in said second position; and a memory disk rotatable in between said auxiliary disks in frictional engagement therewith, the frictional force between said memory disk and said auxiliary disks being greater than that between said auxiliary disks and said housing sidewalls.

BRIEF DESCRIPTION OF THE DRAWINGS

In the accompanying drawings which illustrate exemplary embodiments of the present invention:

FIG. 2 is a sectional view of a first type of floppy disk constructed according to the present invention and taken on the line II—II shown in FIG. 3a;

DESCRIPTION OF THE PREFERRED EMBODIMENT

Figure 4:
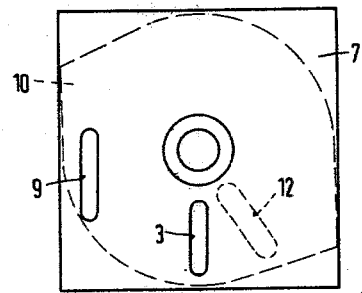
FIGS. 4 and 4a are diagrammatic views of a second type of floppy disk constructed according to the present invention and suitable for use in a write/read unit having no facilities for reversing the direction of rotation of the drive.
Figure 4A:
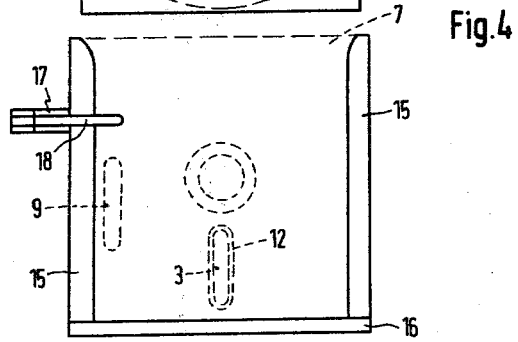
Figure 4A:
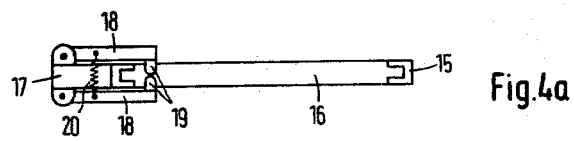

For operating attached disks in FIGS. 4 and 4a, a stationary clamping device is provided in the guide range.

Figure 1:
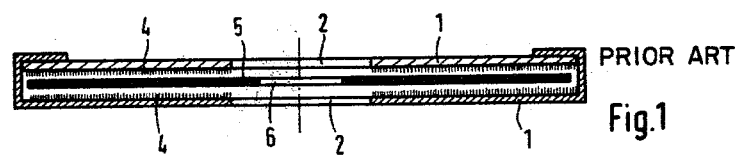
FIG. 1 is a sectional view through a conventional floppy disk.

A circular memory disk 5 is shown in FIG. 1 having, e.g., a magnetizable surface. Memory disk 5 is contained in a housing 1 that is sealed on all sides. Memory disk 5 can be connected by a conventional centering and clamping device to an external drive. Such a device can clamp the edges of disk 5 around a hole 6 therethrough. Housing 1 is provided with holes 2. Holes 2 have a larger diameter than the hole 6 in the center of the memory disk 5.

Radially directed slots are provided at 3 in FIG. 4 through "housing" 7. Slots 3 provide access for a read/write head to a surface of the memory disk 5. Within its range of contact with the memory disk 5, housing 1 is provided on its inner surfaces with a coating 4 of antistatic, porous material. Unlike that shown in FIG. 1, there is little or no actual clearance between memory disk 5 and the coatings 4.

A conventional diskette is shown in FIG. 1, wherein a memory disk 5 is protected by housing 1. The memory disk 5 is unprotected merely at the points where housing 1 is provided with holes or slots. Above all, however, there is a risk that the top surface of the memory disk 5 within the area of the radially directed slot 3 might by touched by the operator's hand. If it is so touched, perspiration and/or greasy deposits can reduce signal intensity during the write/read process. For this reason a floppy disk has been supplied with a housing.

A coating on the inside of a housing including an antistatic, porous material may be employed in accordance with the present invention. In the prior art coatings of a different type were used.

Figure 2:
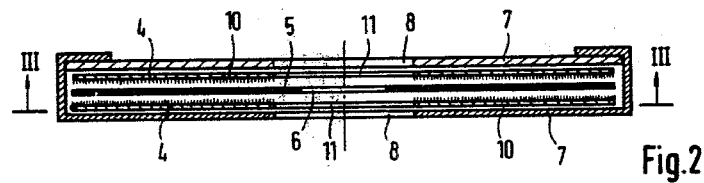
Figure 3A:
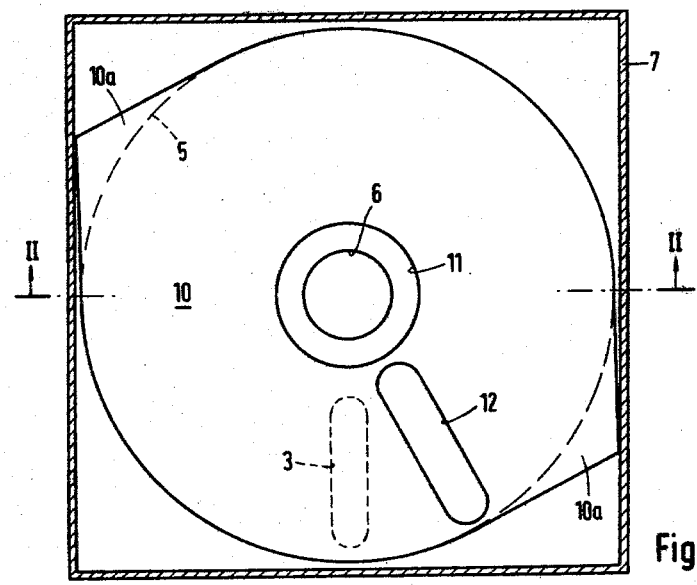
FIGS. 3a and 3b are elevational views partly in section, of a floppy disk constructed according to the present invention, the section being taken on line III—III in FIG. 2, FIGS. 3a and 3b being positional views.
Figure 3B:
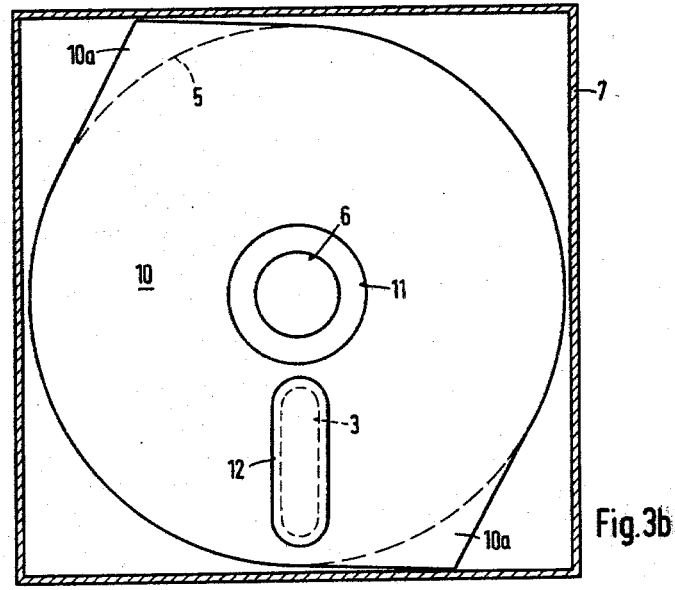

One embodiment of the present invention is shown in FIGS. 2, 3a and 3b. This embodiment differs from the conventional embodiment described hereinbefore in conjunction with FIG. 1, in its outer appearance, by a housing 7 which is somewhat thicker. Moreover, the housing 7 is not coated on the inside. Between its inside surfaces and the memory disk 5 an auxiliary disk 10 is provided. Disks 10 are capable of moving between two positions. On their sides facing the memory disk 5, disks 10 are provided with a coating 4 of antistatic, porous material. The disks 10 are attached to each other. Disks 10 have respective holes 11 that are aligned with corresponding holes 8. The friction value between the housing 7 and the auxiliary disks 10 is smaller than that between the coatings 4 and memory disk 5. For limiting friction between the memory disk 5 and auxiliary disks 10, and for making sure that auxiliary disks 10 will rotate in synchronism, disks 10 are connected to one another at 10a.

The diameter of disk 10 is the same as that of the memory disk 5. For restricting rotary motion thereof, each of the disks 10 is provided with stops 10a arranged diametrically opposite each other. The disks 10 are provided with slots 12 which, in size and arrangement, correspond to radial slots 3 in housing 7. By turning the disks 10 to the position shown in FIG. 3a, the slots 3 in the housing 7 are covered by disks 10. It is not necessary to protect that part of the disk 5 lying in the area of the holes 8 or 11, because the surface portions in this area are outside the recording range. In the position shown in FIG. 3b, the slots 3 and 12 are more or less in alignment. They thus provide access for the read/write head to the surface of the memory disk 5.

Care must be taken that the memory disk 5 within the slots 3, is always covered when not being used. However, access thereto is required for the read/write head.

When a floppy disk as shown in FIG. 2, and when in the state as shown in FIG. 3a is inserted in a write/read unit with a clamping device as described herein before, the conical clamping member clockwisely rotating in the operating direction, will enter into the hole 6 in the center of the memory sheet 5 in the course of the clamping process. At the latest when in the clamped position, the memory sheet is taken along in the clockwise direction. Owing to the different frictional values between the memory sheet 5 and the coated disks 10 on the one hand, and the disks 10 and the protective envelope 7 on the other hand, the attached disks 10 are taken along from the limiting stop position as shown in FIG. 3a into the limiting stop position as shown in FIG. 3b. In this position a slot in the envelope provides access for the read/write head to the surface of the memory sheet 5. Upon completion of a write/read operation, the clamping of the clamping members is eliminated by reversing the direction of rotation of the conical clamping member. By the of the spindle and by the static friction of the memory sheet 5 on the conical clamping member, the memory sheet 5 and, consequently, the attached disks 10 are driven for up to one rotation in the counterclockwise direction. In this way the attached disks 10 will reassume the limiting stop position as shown in FIG. 3a.

The embodiment of FIGS. 3a and 3b differs from the embodiment of FIGS. 4 and 4a in that the housing 7 has a slot 9 on both sides. These slots extend in parallel near one of the longitudinal edges of the housing 7.

For using such types of floppy disks it is necessary in write/read units of the types mentioned hereinbefore to provide guides 15 for the floppy disks.

Guides 15 are provided. One of these guides 15 comprises a clamping device 17 to 20. The latter has a holder 17 which is mounted in a fixed position on the one guide 15. Clamping arms 18 are rotatably mounted on the holder 17. These clamping arms 18 are provided at their ends with inwardly directed clamping clip members 19. The length of the clamping arms 18 is such that the clamping clip members 19 will enter into the slots 9.

When inserting a floppy disk in the guides 15, the slots 9 will come into the range of the clamping clip members 19 during a portion of this movement. During this portion of movement of the floppy disk, these clamping clip members 19 firmly retain the attached disks 10 and the memory sheet as placed therebetween, in position. This causes the latter to rotate in the clockwise direction. Since the slots 9 have a corresponding length, attached disks 10 will reach the limiting stop position shown in FIG. 3b, in which the slots 3 and 12 are in agreement.

When removing the floppy disk, the process is repeated in the opposite direction. This will lead to a turning of the attached disks 10 in the anticlockwise direction. This movement ends up in the limiting stop position shown in FIG. 3a, in which the surface of the memory sheet 5 within the area of the radial slot 3 is covered by the attached disks 10.

The embodiments described hereinbefore are in no way restricted to memory disks having a magnetizable surface as used in the case of floppy disks. The invention also applies, e.g. to phonograph records. The surfaces of commercially available phonograph records are relatively sensitive. Impurities, scratches and other deposits of foreign material easily deteriorate reproduction quality. For this reason, phonograph records are kept in protective envelopes lined with plastic foil.

What is claimed is:

1. A diskette comprising: a housing having approximately parallel side walls, each of said side walls having a first opening therethrough, said first openings being aligned; a pair of parallel auxiliary disks slidable inside said housing against respective ones of said housing side walls; means to hold said auxiliary disks in fixed positions relative to each other, each of said auxiliary disks having a second opening, said second openings always being aligned with each other, said auxiliary disks being slidable back and forth on said respective side walls between first and second positions, said first openings being completely out of registration with said second openings when said auxiliary disks are in said first position, said first openings being at least in partial registration with said second openings when said auxiliary disks are in said second position; and a memory disk rotatable in between said auxiliary disks in frictional engagement therewith, the frictional force between said memory disk and said auxiliary disks being greater than that between said auxiliary disks and said housing sidewalls.

2. The invention as defined in claim 1, wherein said first openings are in complete registration with said second openings when said auxiliary disks are in said second position.

3. The invention as defined in claim 2, wherein at least one of said auxiliary disks and one of said side walls have mutually engagable stop means to limit movement of said auxiliary disks beyond either one of said first and second positions.

4. The invention as defined in claim 1, wherein at least one of said auxiliary disks and one of said side walls have mutually engagable stop means to limit movement of said auxiliary disks beyond either one of said first and second positions.

* * * * *